United States Patent
Yamamoto et al.

(10) Patent No.: US 11,381,754 B2
(45) Date of Patent: Jul. 5, 2022

(54) INFORMATION PROCESSING APPARATUS, INFORMATION PROCESSING METHOD AND COMPUTER READABLE MEDIUM TO GENERATE A LUMINANCE DISTRIBUTION OF A PHOTOGRAPHED TARGET AREA

(71) Applicant: Mitsubishi Electric Corporation, Tokyo (JP)

(72) Inventors: Eiji Yamamoto, Tokyo (JP); Masaki Oda, Tokyo (JP); Seiji Okumura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 5 days.

(21) Appl. No.: 17/327,086

(22) Filed: May 21, 2021

(65) Prior Publication Data

US 2021/0281734 A1 Sep. 9, 2021

Related U.S. Application Data

(63) Continuation of application No. PCT/JP2019/001290, filed on Jan. 17, 2019.

(51) Int. Cl.
*H04N 5/235* (2006.01)
*H04N 5/232* (2006.01)
*G06V 10/60* (2022.01)

(52) U.S. Cl.
CPC ........... *H04N 5/2353* (2013.01); *G06V 10/60* (2022.01); *H04N 5/232* (2013.01); *H04N 5/2351* (2013.01)

(58) Field of Classification Search
CPC .... H04N 5/2353; H04N 5/232; H04N 5/2351; G06K 9/4661; G01J 1/42
See application file for complete search history.

(56) References Cited

U.S. PATENT DOCUMENTS

| 8,576,295 B2 * | 11/2013 | Ito ................. H04N 5/23206 348/222.1 |
| 2008/0043114 A1 * | 2/2008 | Sung ................. H04N 5/3535 382/312 |

FOREIGN PATENT DOCUMENTS

| CN | 102354489 A | * | 2/2012 |
| ES | 2454115 B2 | * | 4/2014 |

(Continued)

OTHER PUBLICATIONS

International Search Report for PCT/JP2019/001290 (PCT/ISA/210) dated Apr. 16, 2019.

*Primary Examiner* — Twyler L Haskins
*Assistant Examiner* — Angel L Garces-Rivera
(74) *Attorney, Agent, or Firm* — Birch, Stewart, Kolasch & Birch, LLP

(57) ABSTRACT

A camera control section (21) fixes among parameters for photographing which are set in a camera (1), another parameter than exposure time, and causes the camera (1) to photograph a photographing target area while changing the exposure time. An image acquisition section (11) acquires N (N≥3) images of the photographing target area acquired by photographing by the camera (1). A model generation section (100) extracts for each pixel position, pixel values of a same pixel position from the N images, and generates a model indicating for each pixel position, a relationship between exposure times and pixel values, based on the extracted pixel values of the same pixel position and an exposure time at a time of photographing of each of the N images. A luminance value calculation section (52) calculates a luminance value for each pixel position, using the generated model and a luminance coefficient. A luminance distribution generation section (61) generates a luminance (Continued)

distribution of the photographing target area, using the luminance value of each pixel position.

12 Claims, 13 Drawing Sheets

(56) References Cited

FOREIGN PATENT DOCUMENTS

| | | | |
|---|---|---|---|
| JP | 4-136719 | A | 5/1992 |
| JP | 2006-118990 | A | 5/2006 |
| JP | 2006-118991 | A | 5/2006 |
| JP | 2011-44927 | A | 3/2011 |

* cited by examiner

INFORMATION PROCESSING APPARATUS, INFORMATION PROCESSING METHOD AND COMPUTER READABLE MEDIUM TO GENERATE A LUMINANCE DISTRIBUTION OF A PHOTOGRAPHED TARGET AREA

CROSS REFERENCE TO RELATED APPLICATION

This application is a Continuation of PCT International Application No. PCT/JP2019/001290, filed on Jan. 17, 2019, which is hereby expressly incorporated by reference into the present application.

TECHNICAL FIELD

The present invention relates to a luminance distribution measurement technique using a camera image.

BACKGROUND ART

In a conventional luminance distribution measurement technique (for example, Patent Literature 1) using a camera image, a photographing condition for a photographing means is changed by a photographing condition setting means, and the photographing means photographs a same measurement target point a plurality of times under different photographing conditions. Further, an image generation means presets as a specific value, a gradation value in a range in which an error between a pixel value and a luminance is smaller than the other ranges within an output range of the pixel value of the photographing means. Then, in a plurality of images photographed by the photographing means, pixel values of a pixel corresponding to a same measurement point are compared with the specific value. Further, a pixel value closest to the specific value is selected, and a luminance of the measurement point is obtained from the selected pixel value.

Further, in another luminance distribution measurement technique (for example, Patent Literature 2), a camera control section sets a photographing condition for a camera which is constituted of a digital still camera. Further, an image generation section takes in from the camera, a plurality of images photographed under different photographing conditions. Further, the image generation section converts a pixel value of each pixel into a luminance using a conversion equation. Then, the image generation section obtains a luminance distribution of a measurement target by synthesizing the luminance of each pixel.

CITATION LIST

Patent Literature

Patent Literature 1: JP2006-118990A
Patent Literature 2: JP2006-118991A

SUMMARY OF INVENTION

Technical Problem

In the conventional luminance distribution measurement techniques using the camera image, the luminance distribution is synthesized by obtaining luminance values in a luminance range that can be acquired from each image of a plurality of images photographed under different exposure times.

In the outdoors or the indoors where natural light enters through a window, an amount of natural light changes from moment to moment depending on an amount of cloud covering the sun. Therefore, even under the same exposure time, luminance values of pixels obtained from an image photographed at a moment when a large amount of cloud covers the sun may be different from luminance values of pixels obtained from an image photographed at a moment when a small amount of cloud covers the sun. Luminance values obtained from an image photographed at a moment of a small amount of natural light are lower values than accurate luminance values. On the other hand, the luminance values obtained from an image photographed at a moment of a large amount of natural light are higher values than the accurate luminance values. As described above, measurement errors vary depending on a change in an amount of natural light, thus there is a problem that an accurate luminance distribution cannot be generated when using the luminance values obtained from the images photographed at different moments.

The present invention mainly aims to solve such a problem. More specifically, the present invention mainly aims to obtain an accurate luminance distribution without any influence from natural light.

Solution to Problem

An information processing apparatus according to the present invention includes:

a camera control section to fix among parameters for photographing which are set in a camera, another parameter than exposure time, and cause the camera to photograph a photographing target area while changing the exposure time;

an image acquisition section to acquire N (N≥3) images of the photographing target area acquired by photographing by the camera;

a model generation section to extract for each pixel position, pixel values of a same pixel position from the N images, and generate a model indicating for each pixel position, a relationship between exposure times and pixel values, based on the extracted pixel values of the same pixel position and an exposure time at a time of photographing of each of the N images;

a luminance value calculation section to calculate a luminance value for each pixel position, using the generated model and a luminance coefficient; and a luminance distribution generation section to generate a luminance distribution of the photographing target area, using the luminance value of each pixel position.

Advantageous Effects of Invention

According to the present invention, it is possible to obtain an accurate luminance distribution without any influence from natural light.

DESCRIPTION OF EMBODIMENTS

Figure 1:
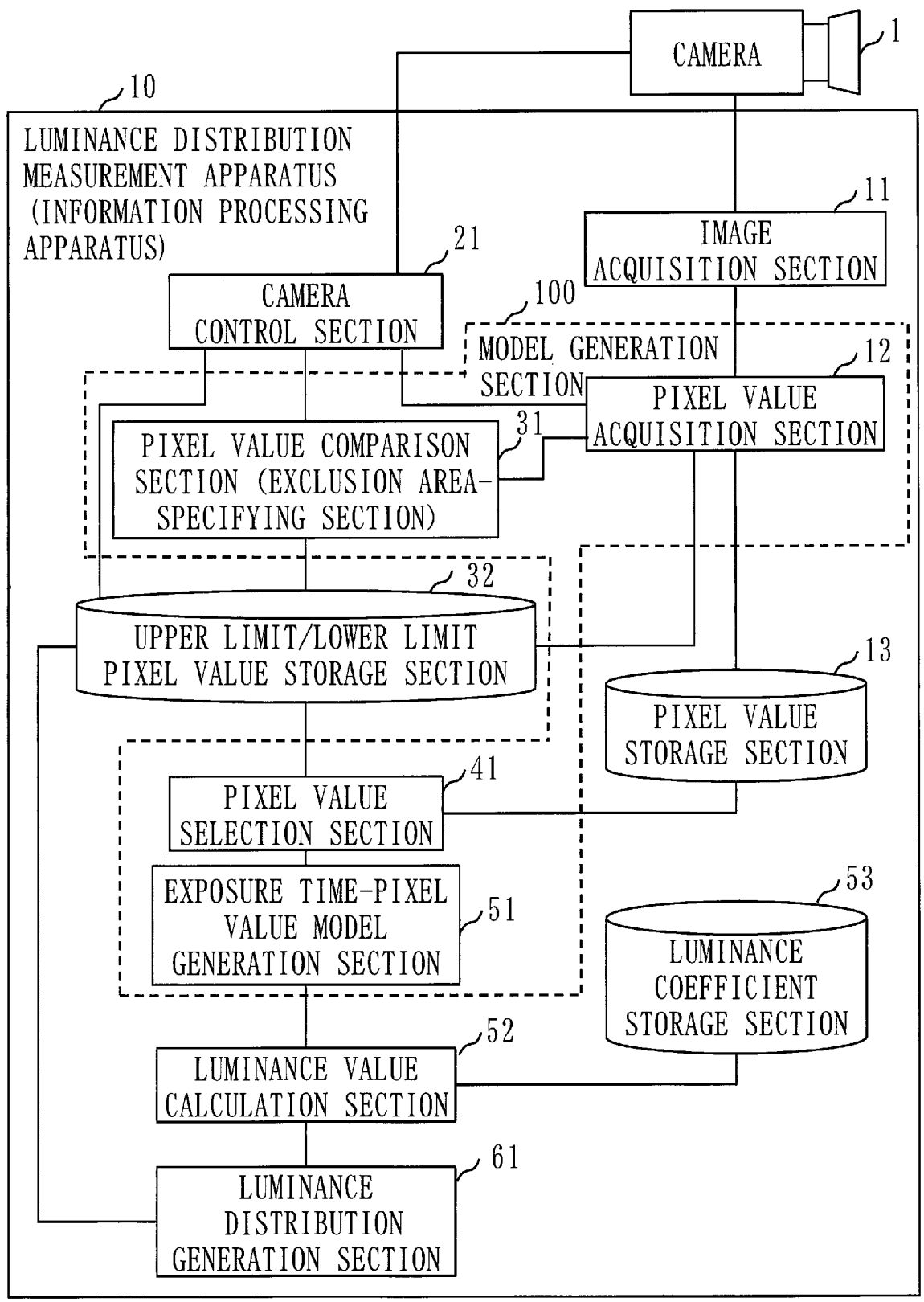
FIG. 1 is a diagram illustrating a functional configuration example of a luminance distribution measurement apparatus according to a first embodiment.

Hereinafter, embodiments of the present invention will be described with reference to the drawings. In the following description of the embodiments and the drawings, the same reference numerals indicate the same or corresponding parts.

First Embodiment

*Description of Configuration*

FIG. 1 illustrates a functional configuration example of a luminance distribution measurement apparatus 10 according to a first embodiment.

The luminance distribution measurement apparatus 10 is equivalent to an information processing apparatus. Further, operation performed by the luminance distribution measurement apparatus 10 is equivalent to an information processing method and an information processing program.

The luminance distribution measurement apparatus 10 is connected to a camera 1. The camera 1 photographs a photographing target area. The luminance distribution measurement apparatus 10 sets parameters (photographing parameters) of the camera 1 for photographing. Further, the luminance distribution measurement apparatus 10 acquires a photographed image (hereinafter, also simply referred to as an image) from the camera 1.

In FIG. 1, an image acquisition section 11 acquires the photographed image of the photographing target area obtained by photographing by the camera 1. A process performed by the image acquisition section 11 is equivalent to an image acquisition process.

A camera control section 21 performs photographing control of the camera 1. Further, the camera control section 21 sets the photographing parameters. A process performed by the camera control section 21 is equivalent to a camera control process.

An upper limit/lower limit pixel value storage section 32 stores an upper limit pixel value and a lower limit pixel value.

A pixel value acquisition section 12 acquires a pixel value of each pixel position from the image acquired by the image acquisition section 11.

A pixel value comparison section 31 compares the pixel value of each pixel position with the upper limit pixel value or the lower limit pixel value. Further, the pixel value comparison section 31 specifies an area outside a luminance measurement range (an example of an exclusion area).

The pixel value comparison section 31 constitutes a part of a model generation section 100 which will be described later, and also operates as an exclusion area-specifying section.

A pixel value storage section 13 stores the pixel value of each pixel position and an exposure time at a time of photographing.

A pixel value selection section 41 selects a pixel value satisfying a condition that the pixel value is larger than the lower limit pixel value and smaller than the upper limit image value, among pixel values stored in the pixel value storage section 13.

An exposure time-pixel value model generation section 51 generates a model that approximates a relationship between the exposure times and the pixel values.

Besides, the pixel value acquisition section 12, the pixel value comparison section 31, the pixel value selection section 41, and the exposure time-pixel value model generation section 51 are collectively referred to as the model generation section 100.

That is, the model generation section 100 extracts for each pixel position, pixel values of the same pixel position from N (N≥3) images, and generates a model indicating for each pixel position, a relationship between the exposure times and the pixel values, based on the extracted pixel values of the same pixel position and the exposure time at a time of photographing of each of the N images.

Note that, a process performed by the model generation section 100 is equivalent to a model generation process.

A luminance value calculation section 52 calculates a luminance value for each pixel position, using the model generated by the exposure time-pixel value model generation section 51 and a luminance coefficient. A process performed by the luminance value calculation section 52 is equivalent to a luminance value calculation process.

A luminance coefficient storage section 53 stores the luminance coefficient.

A luminance distribution generation section 61 generates the luminance distribution of the photographing target area, using the luminance value of each pixel position calculated by the luminance value calculation section 52. A process performed by the luminance distribution generation section 61 is equivalent to a luminance distribution generation process.

Figure 5:
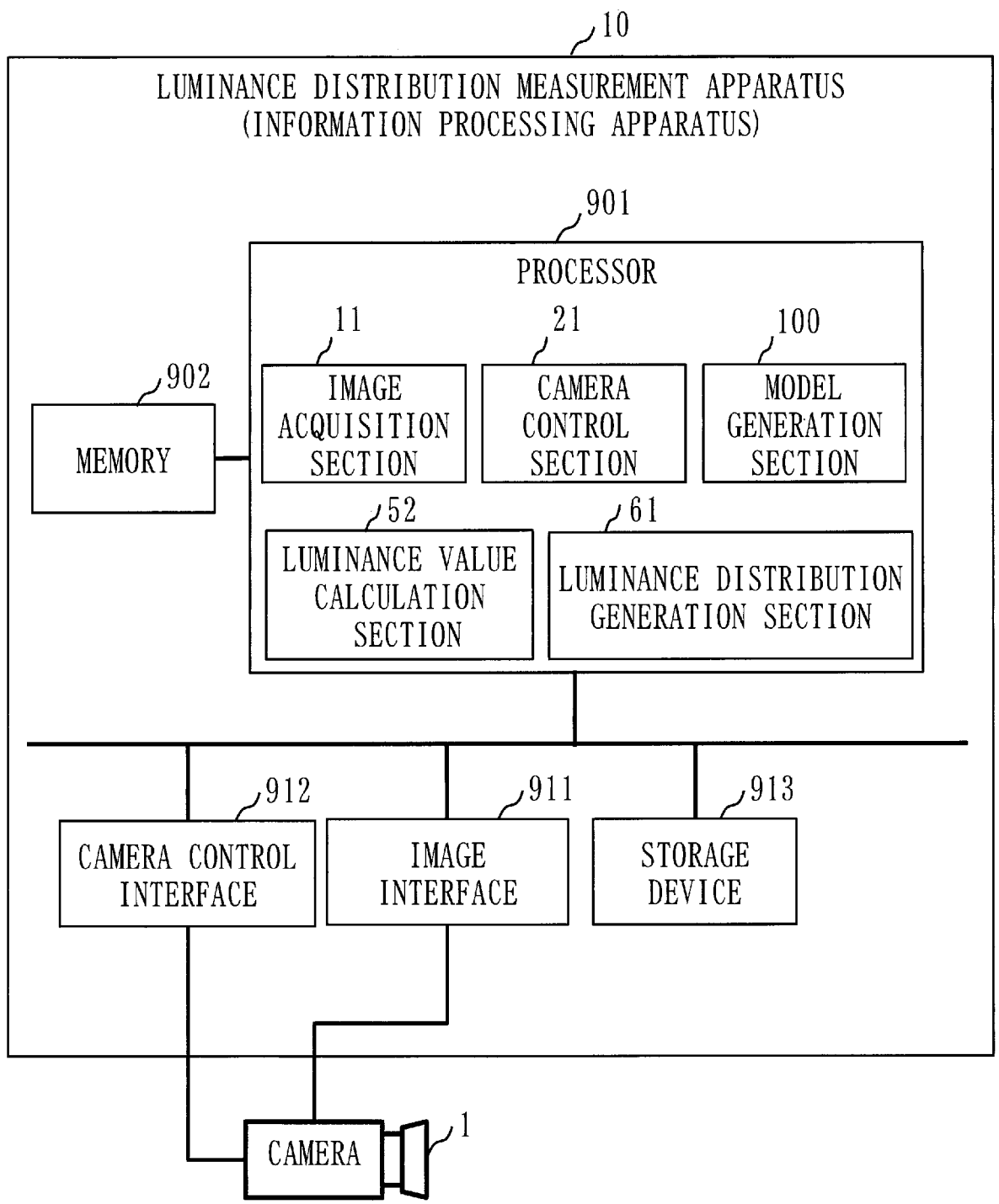
FIG. 5 is a diagram illustrating a hardware configuration example of the luminance distribution measurement apparatus according to the first embodiment.

FIG. 5 illustrates a hardware configuration example of the luminance distribution measurement apparatus 10 according to the present embodiment.

The luminance distribution measurement apparatus 10 according to the present embodiment is a computer.

The luminance distribution measurement apparatus 10 includes a processor 901, a memory 902, an image interface 911, a camera control interface 912, and a storage device 913 as pieces of hardware.

The storage device 913 stores programs that realize functions of the image acquisition section 11, the pixel value acquisition section 12, the camera control section 21, the model generation section 100, the luminance value calculation section 52, and the luminance distribution generation section 61 illustrated in FIG. 1.

These programs are loaded from the storage device 913 into the memory 902. Then, the processor 901 executes these programs and performs operation of the image acquisition section 11, the camera control section 21, the model generation section 100, the luminance value calculation section 52, and the luminance distribution generation section 61.

FIG. 5 schematically illustrates a state in which the processor 901 executes the programs that realize the functions of the image acquisition section 11, the camera control section 21, the model generation section 100, the luminance value calculation section 52, and the luminance distribution generation section 61.

Note that, in FIG. 5, the processor 901 realizes the functions of the image acquisition section 11, the camera control section 21, the model generation section 100, the luminance value calculation section 52, and the luminance distribution generation section 61, however, at least a part of these functions may be realized by an image processing processor (not illustrated in FIG. 5).

Further, the pixel value storage section 13, the upper limit/lower limit pixel value storage section 32, and the luminance coefficient storage section 53 in FIG. 1 are realized by the memory 902 or the storage device 913.

The camera control section 21 in FIG. 1 controls the camera 1 via the camera control interface 912. Further, the image acquisition section 11 in FIG. 1 acquires the photographed image from the camera 1 via the image interface 911.

*Description of Operation*

Next, an operation example of the luminance distribution measurement apparatus 10 according to the present embodiment will be described with reference to FIGS. 2 to 4.

Figure 2:
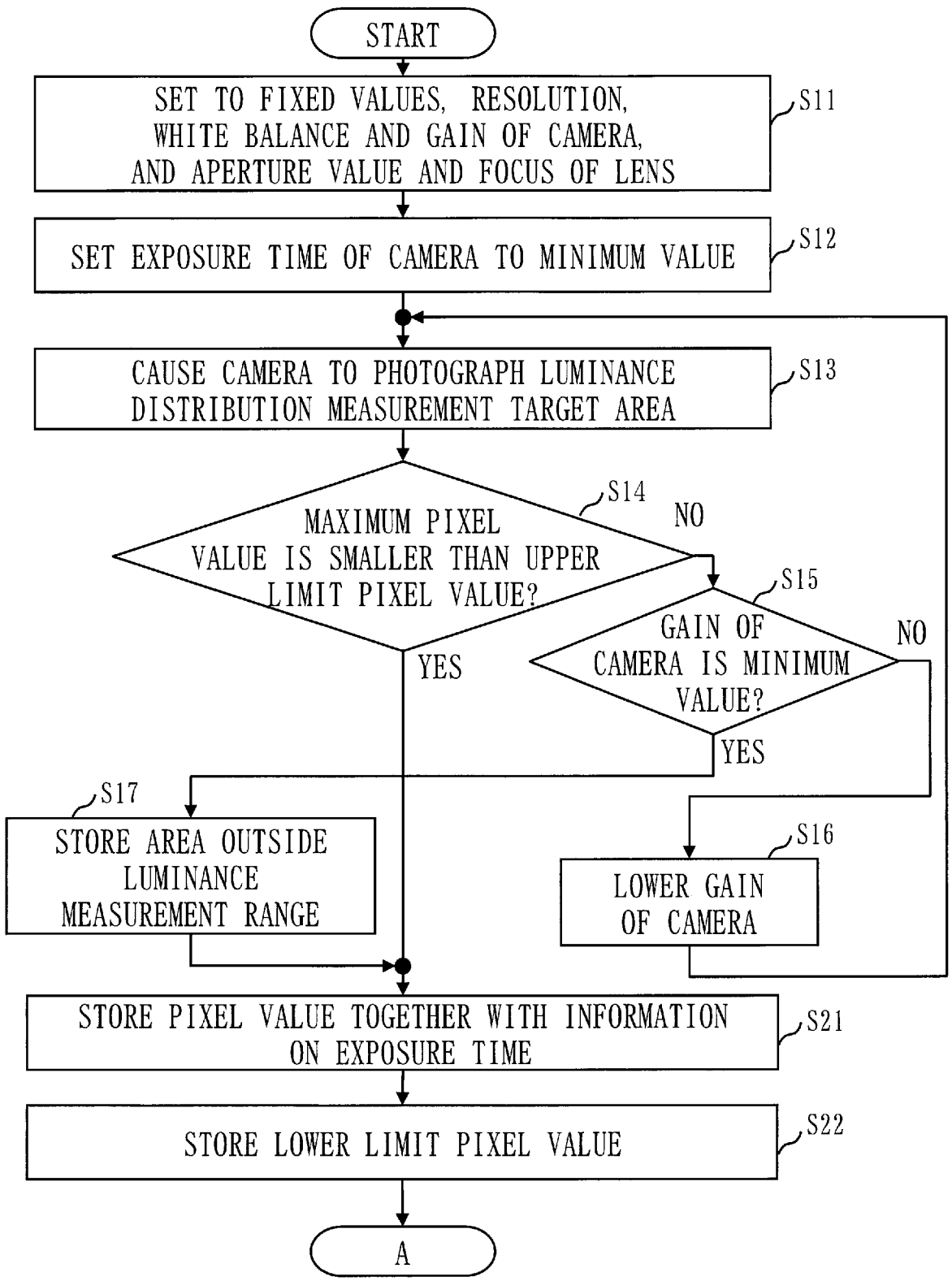
FIG. 2 is a flowchart illustrating an operation example of the luminance distribution measurement apparatus according to the first embodiment.

FIG. 2 is a flowchart illustrating an operation example of a gain value adjustment process of the camera 1.

Figure 3:
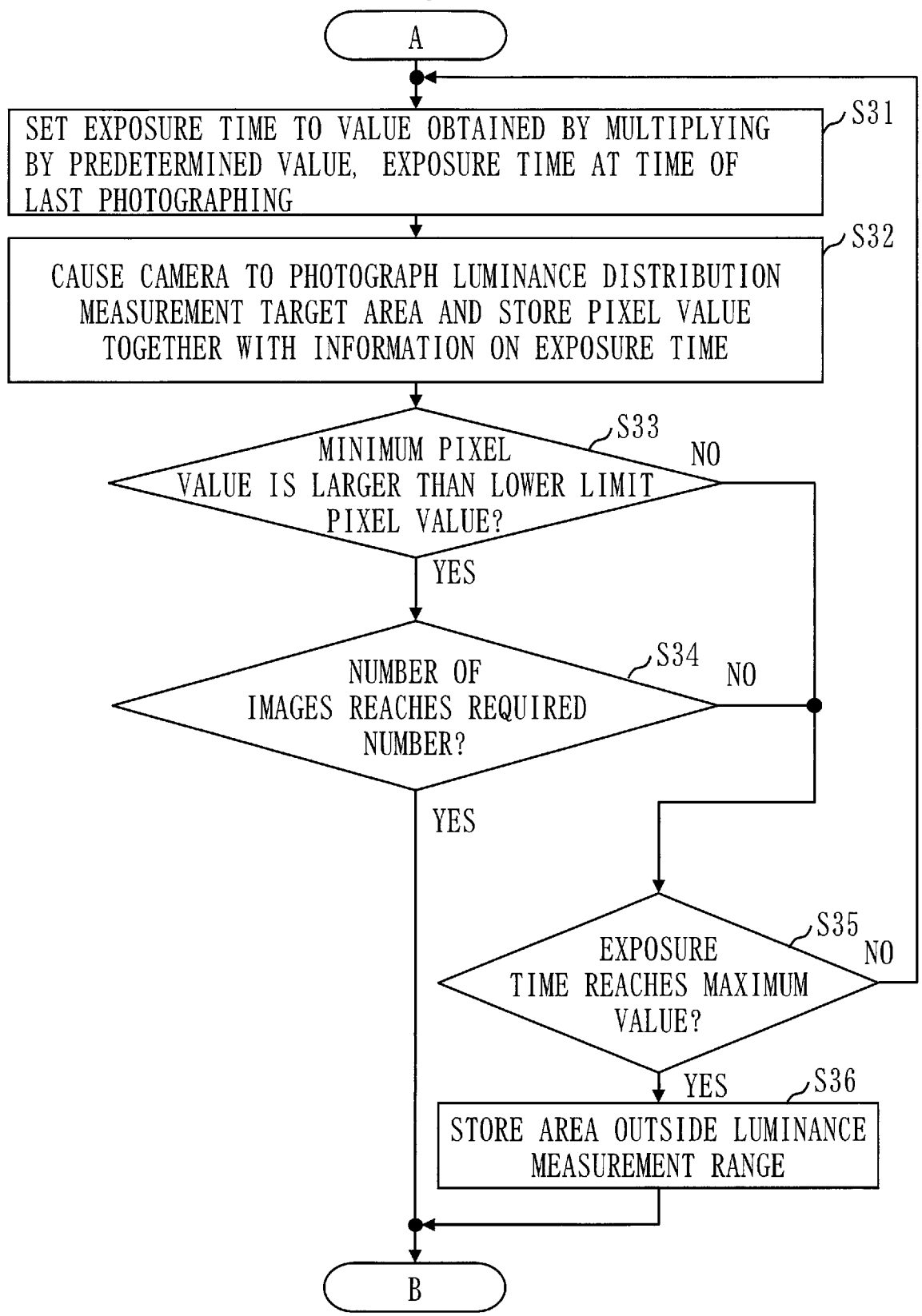
FIG. 3 is a flowchart illustrating an operation example of the luminance distribution measurement apparatus according to the first embodiment.

FIG. 3 is a flowchart illustrating an operation example of a camera photographing process.

Figure 4:
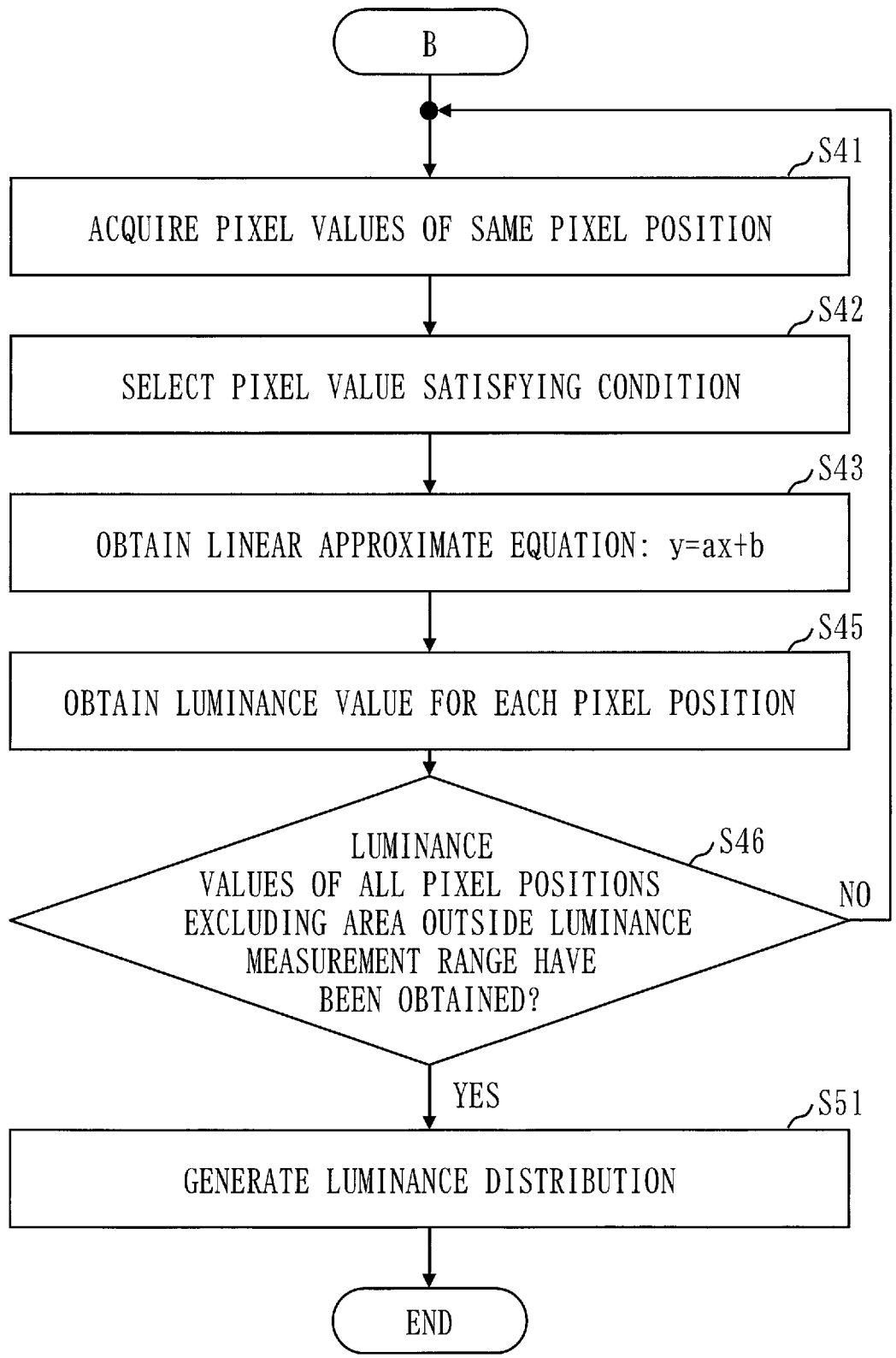
FIG. 4 is a flowchart illustrating an operation example of the luminance distribution measurement apparatus according to the first embodiment.

FIG. 4 is a flowchart illustrating an operation example of the luminance value calculation process and the luminance distribution generation process.

In the present embodiment, an example will be described in which a linear approximate equation is generated as the model indicating the relationship between the exposure time and the pixel value. Note that, the model indicating the relationship between the exposure time and the pixel value is not limited to the linear approximate equation, and may be a quadratic or higher polynomial approximate equation or matrix.

First, the gain value adjustment process of the camera 1 will be described with reference to FIG. 2.

The camera control section 21 sets to fixed values, a resolution, white balance, and gain of the camera 1, and an aperture value and focus of lens mounted on the camera 1 (step S11).

Here, the camera control section 21 sets the aperture value of the lens to a maximum value and sets the focus to infinity in order to minimize influence of limb darkening.

Next, the camera control section 21 sets the exposure time of the camera 1 to a minimum value that can be set (step S12).

Next, the camera control section 21 causes the camera 1 to photograph a luminance distribution measurement target area (step S13). That is, the camera control section 21 causes the camera 1 to photograph the luminance distribution measurement target area under the photographing parameters other than the exposure time set in step S11 and the exposure time set in step S12.

Note that, the image photographed by the camera 1 is acquired by the image acquisition section 11 from the camera 1.

Next, the pixel value acquisition section 12 acquires a pixel value for each pixel position from the image acquired by the image acquisition section 11, and outputs the acquired pixel value to the pixel value comparison section 31.

The pixel value comparison section 31 determines whether or not the maximum pixel value in the image is smaller than the upper limit pixel value stored in advance in the upper limit/lower limit pixel value storage section 32 (step S14). Here, the upper limit pixel value is an upper limit value (the p-th power of 256-1) that can be expressed by p bytes in a case of an image format in which the pixel value is expressed by p byte data. However, if the pixel value is saturated even though the pixel value is smaller than the upper limit pixel value depending on characteristics (image format) of a camera to be used, the pixel value comparison section 31 treats the saturated pixel value as the upper limit pixel value.

When the maximum pixel value in the image is equal to or larger than the upper limit pixel value (NO in step S14), the pixel value comparison section 31 determines whether or not the gain of the camera 1 is the minimum value (step S15). If the gain of the camera is not the minimum value (NO in step S15), the pixel value comparison section 31 instructs the camera control section 21 to lower the gain of the camera 1. The camera control section 21 lowers the gain of the camera 1 according to the instruction from the pixel value comparison section 31 (step S16).

The above processes of steps S13 to S16 are repeated until the maximum value of the pixel value in the image becomes smaller than the upper limit pixel value.

Here, for example, when the sun appears in the luminance distribution measurement target area, the maximum pixel value does not become smaller than the upper limit pixel value even if the gain of the camera 1 is the minimum value that can be set. Therefore, in such a case, the pixel value comparison section 31 specifies as the area outside the luminance measurement range, an area in the image whose maximum pixel value is equal to or larger than the upper limit pixel value even if the gain is the minimum value (YES in step S15). Then, the pixel value comparison section 31 stores information indicating the area outside the luminance measurement range in the upper limit/lower limit pixel value storage section 32 (step S17).

Further, when step S14 is YES, or after step S17 is performed, the pixel value acquisition section 12 stores in the pixel value storage section 13, the pixel value of each pixel position in the image together with information on the exposure time (step S21).

Further, the pixel value acquisition section 12 stores the minimum pixel value in photographing with a shortest exposure time that can be set, as the lower limit pixel value in the upper limit/lower limit pixel value storage section 32 (step S22).

From the above, the gain value adjustment process of the camera 1 is completed.

Next, the camera photographing process will be described with reference to FIG. 3.

First, the camera control section 21 sets the exposure time of the camera to a value obtained by multiplying by a predetermined value, the exposure time at a time of last photographing (step S31).

Next, the camera control section 21 causes the camera 1 to photograph the luminance distribution measurement target area, and the pixel value acquisition section 12 stores in the pixel value storage section 13, the pixel value of each pixel position in the image together with the information on the exposure time at the time of photographing (step S32).

More specifically, in the same manner as described above, the image acquisition section 11 acquires the image photographed by the camera 1. Further, the pixel value acquisition section 12 acquires a pixel value for each pixel position from the image acquired by the image acquisition section 11. Further, the pixel value acquisition section 12 stores in the pixel value storage section 13, the acquired pixel value together with the information on the exposure time.

Further, the pixel value acquisition section 12 outputs the acquired pixel value to the pixel value comparison section 31.

The pixel value comparison section 31 determines whether or not the minimum pixel value in the image is larger than the lower limit pixel value (step S33).

When the minimum pixel value in the image is larger than the lower limit pixel value (YES in step S33), the pixel value comparison section 31 determines whether or not the number of photographed images reaches a required number (step S34).

The required number is the number of images required for generating the model (linear approximate equation).

The required number is, for example, three. As the number of photographed images satisfying a condition that the minimum pixel value is larger than the lower limit pixel value increases, calculation accuracy of the luminance value by the luminance value calculation section 52 improves.

If both of step S33 and step S34 are NO, the pixel value comparison section 31 determines whether or not the exposure time reaches the maximum value (step S35).

If the exposure time does not reach the maximum value (NO in step S35), the process returns to step S31, and the camera control section 21 sets a new exposure time to the value obtained by multiplying by the specified value, the exposure time at the time of the last photographing. After that, operation of and after step S32 is performed.

That is, the camera control section 21 fixes photographing parameters other than the exposure time among the photographing parameters of the camera 1, meanwhile, causes the camera 1 to photograph the luminance distribution measurement target area while changing the exposure time by multiplying the exposure time by a predetermined value.

On the other hand, when the exposure time reaches the maximum value (YES in step S35), the pixel value comparison section 31 specifies the area outside the luminance measurement range, and stores in the upper limit/lower limit pixel value storage section 32, the information indicating the specified area outside the luminance measurement range (step S36).

In step S36, the pixel value comparison section 31 specifies as the area outside the luminance measurement range, a pixel area in which the number of images in which the pixel value larger than the lower limit pixel value has been obtained does not reach the required number when a maximum exposure time is reached as a result of increasing the exposure time and photographing the luminance distribution measurement target area a plurality of times by the camera 1. For example, it is assumed that the required number is three. Further, it is assumed that five images have been obtained when the maximum exposure time is reached. Among the five images, it is assumed that the pixel values in the area of 20 pixels×20 pixels from an upper left are equal to or smaller than the lower limit pixel value in three images, and the pixel values in the same area are larger than the lower limit pixel value in two images. In this case, the number of images in which the pixel values larger than the lower limit pixel value are obtained in the area of 20 pixels×20 pixels from the upper left is two, which does not reach the required number of images. Therefore, the pixel value comparison section 31 specifies the area of 20 pixels× 20 pixels from the upper left as the area outside the luminance measurement range.

By the above processes, the camera photographing process is completed.

Note that, in the present embodiment, it is assumed that N (N≥3) images are stored in the pixel value storage section 13 by the processes in FIG. 3.

Next, the luminance value calculation process and the luminance distribution generation process will be described with reference to FIG. 4.

First, the pixel value selection section 41 acquires for each pixel position, pixel values of the same pixel position from the N images stored in the pixel value storage section 13 (step S41). Note that, the pixel value selection section 41 does not acquire the pixel values of the pixel positions in the area outside the luminance measurement range stored in the upper limit/lower limit pixel value storage section 32.

Further, in step S41, the pixel value selection section 41 also acquires information on the exposure time at a time of photographing of each of the N images from the pixel value storage section 13.

Next, the pixel value selection section 41 selects a pixel value satisfying a condition that the pixel value is larger than the lower limit pixel value and smaller than the upper limit image value, among the pixel values acquired in step S41 (step S42).

Figure 6:
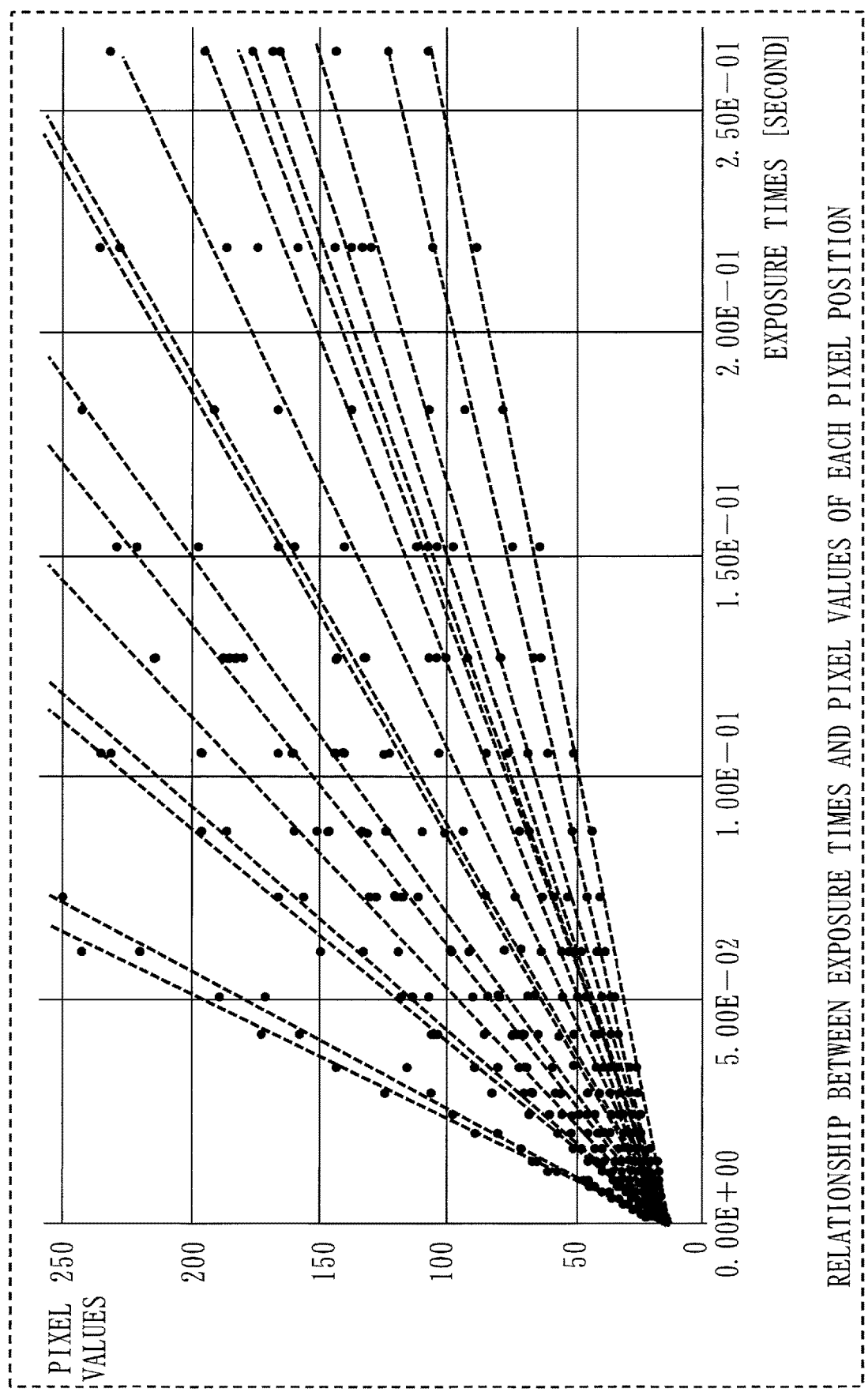
FIG. 6 is a diagram illustrating a relationship between exposure times and pixel values of each pixel position according to the first embodiment.

As exemplified in FIG. 6, the exposure times at the time of photographing and the pixel values have a linear relationship in which a Y-intercept is the lower limit pixel value when the exposure times are disposed along an X-axis and the pixel values are disposed along a Y-axis.

In the present embodiment, the photographing parameters other than the exposure time are fixed, and the same luminance distribution measurement target area (photographing target area) is photographed a plurality of times while changing the exposure time. Therefore, as for the same pixel position, an amount of light incident on the image sensor of the camera 1 is proportional to the exposure time. As a result, as for the same pixel position, the exposure time and the pixel value have the linear relationship. In FIG. 6, each line represents the pixel position. Note that, in the example illustrated in FIG. 6, a reason why there are values slightly deviating from the lines is that outside light varies depending on a time when photographed.

In the flow in FIG. 4, the exposure time-pixel value model generation section 51 obtains y=ax+b which is the linear approximate equation of exposure time-pixel value, using the pixel value selected in step S42 and the exposure time acquired in step S41 (step S43).

Here, "x" is the exposure time at the time of photographing. "y" is the pixel value. A constant "b" is the lower limit pixel value. An inclination value "a" is proportional to the amount of light incident on the image sensor which corresponds to the pixel. As described above, the amount of light incident on the image sensor is proportional to the exposure time.

The luminance (unit: cd/m2) is a value expressing intensity of light in a specific direction as a luminosity (unit: cd) per unit area of a light source. Therefore, the luminance of each pixel position is proportional to the inclination value "a" of the linear approximate equation: y=ax+b.

Therefore, it is possible to obtain the luminance of each pixel position from the linear approximate equation: y=ax+b. Further, by using the linear approximate equation: y=ax+b, it is possible to flatten a variation in the pixel values for each image when the outside light changes.

In the flow in FIG. 4, next, the luminance value calculation section 52 then obtains the luminance for each pixel position (step S45).

Figure 7:
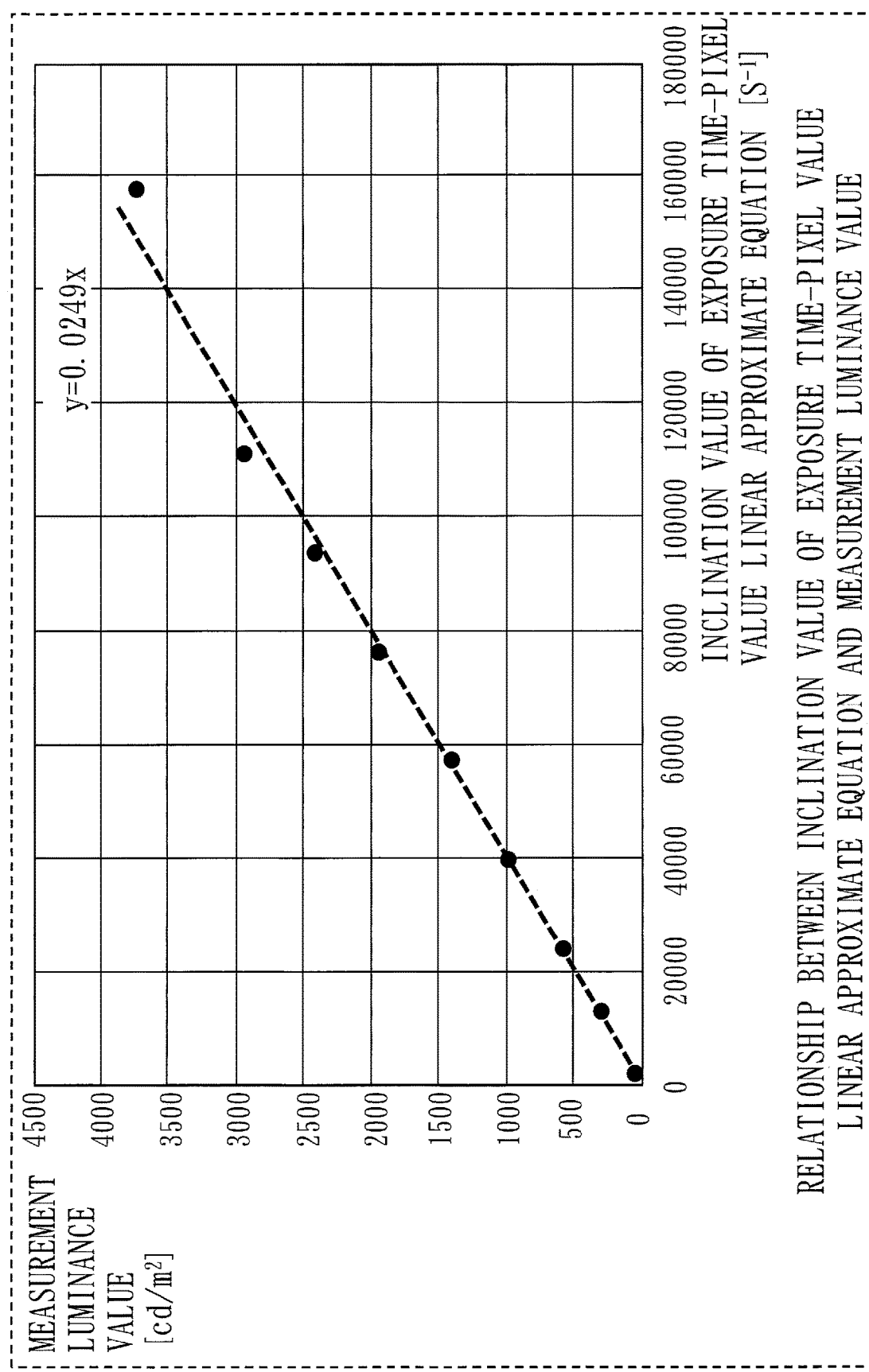
FIG. 7 is a diagram illustrating a relationship between inclination values of a linear approximate equations and measurement luminance values according to the first embodiment.

More specifically, the luminance value calculation section 52 obtains the luminance value of each pixel position by multiplying by the luminance coefficient stored in the luminance coefficient storage section 53, the inclination value: a of the linear approximate equation of the exposure time-pixel value obtained by the exposure time-pixel value model generation section 51. The luminance coefficient is a coefficient indicating a relationship between the inclination value: a of the exposure time-pixel value linear approximate equation calculated from images obtained by photographing an arbitrary area under the white balance and the gain obtained by a procedure in FIG. 2, and the luminance value which serves as a reference and is obtained by measuring the arbitrary area with the usage of the luminance meter. FIG. 7 illustrates a relationship between the inclination value "a" of the linear approximate equation and the luminance value measured by the luminance meter (LS-110 manufactured by Konica Minolta). When the inclination value of the linear approximate equation is x and the measured luminance value is y, y=0.0249x is obtained in an example in FIG. 7. That is, in the example in FIG. 7, the luminance coefficient is 0.0249.

The luminance value calculation section 52 determines whether or not the luminance values of all pixel positions excluding the area outside the luminance measurement range have been obtained (step S46).

If there is a pixel position for which the luminance value has not been obtained (NO in step S46), the processes of and after step S41 are repeated for each pixel position.

On the other hand, when the luminance values of all the pixel positions excluding the area outside the luminance measurement range have been obtained (YES in step S46), the luminance distribution generation section 61 generates the luminance distribution of the luminance distribution measurement target area, using the luminance values of all the pixel positions excluding the area outside the luminance measurement range (step S51).

*Description of Effect of Embodiment*

As described above, in the present embodiment, the model generation section 100 generates the model that approximates the relationship between the pixel values and the exposure times, using the pixel values of the same pixel position in the plurality of images photographed under different exposure times, and the exposure times. Then, the luminance value calculation section 52 calculates the luminance value of each pixel position, using the model and the luminance coefficient. Then, the luminance distribution generation section 61 generates the luminance distribution, using the luminance value of each pixel position calculated by the luminance value calculation section 52.

By such a procedure, in the present embodiment, the variation in the pixel values for each image when the amount of natural light changes is flattened, and as a result, it is possible to suppress a variation in the measurement errors in the luminance distribution. That is, according to the present embodiment, it is possible to obtain an accurate luminance distribution without any influence from the natural light.

Second Embodiment

In the present embodiment, differences from the first embodiment will be mainly described.

Note that, matters not described below are the same as those in the first embodiment.

*Description of Configuration*

Figure 8:
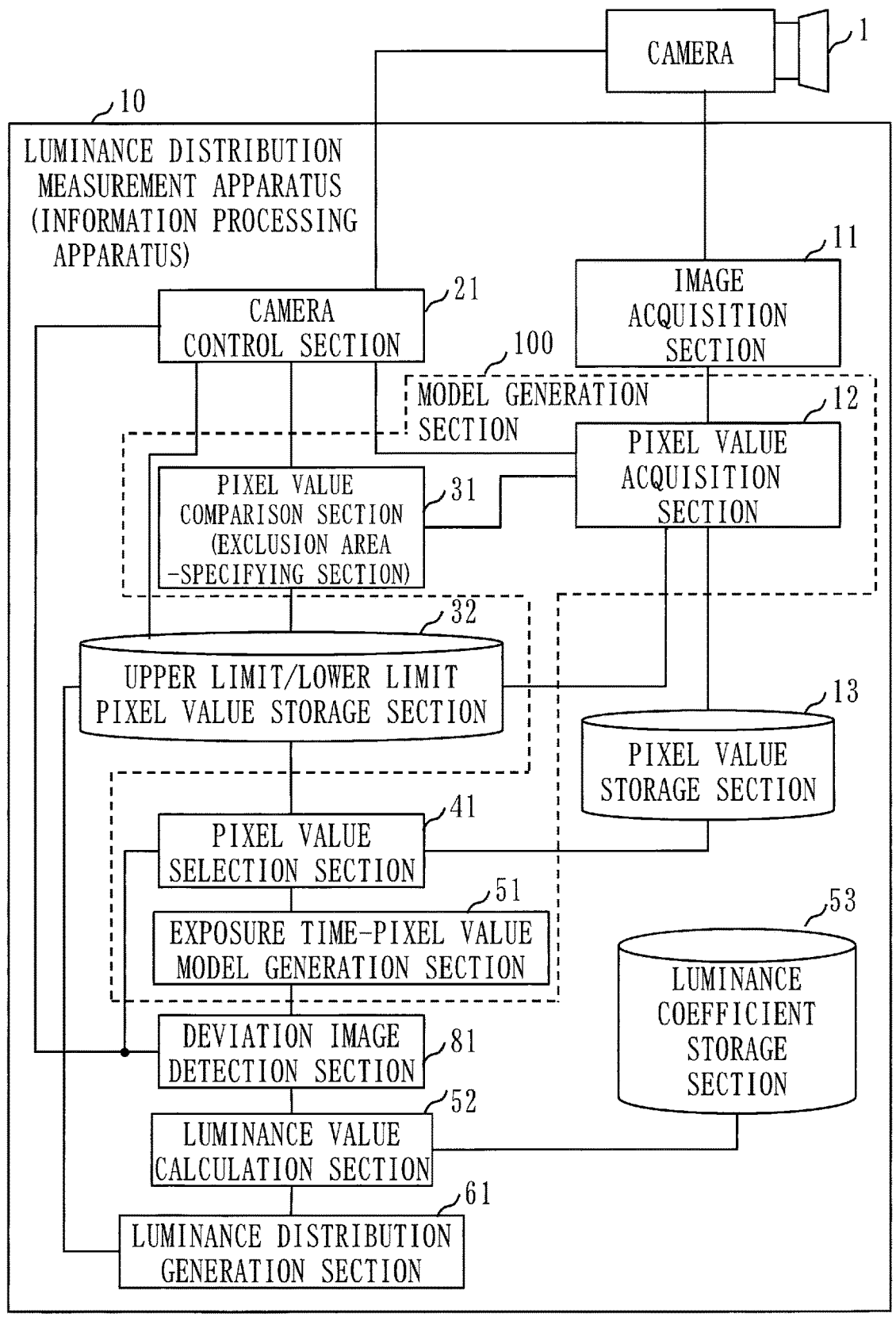
FIG. 8 is a diagram illustrating a functional configuration example of a luminance distribution measurement apparatus according to a second embodiment.

FIG. 8 illustrates a functional configuration example of the luminance distribution measurement apparatus 10 according to a second embodiment.

In FIG. 8, elements having the same reference numerals as those in FIG. 1 indicate the same or corresponding parts. Descriptions of the elements having the same reference numerals as those in FIG. 1 will be omitted.

In FIG. 8, a deviation image detection section 81 is added to the configuration illustrated in FIG. 1.

The deviation image detection section 81 detects an image in which the relationship between the exposure time and the pixel value of each pixel position deviates from the model, after the exposure time-pixel value model generation section 51 generates the model. That is, the deviation image detection section 81 detects an image whose deviation width from the model is significantly larger than those of the other images.

The deviation image detection section 81 is also realized by a program. The program that realizes a function of the deviation image detection section 81 is executed by the processor 901 illustrated in FIG. 5.

*Description of Operation*

Figure 9:
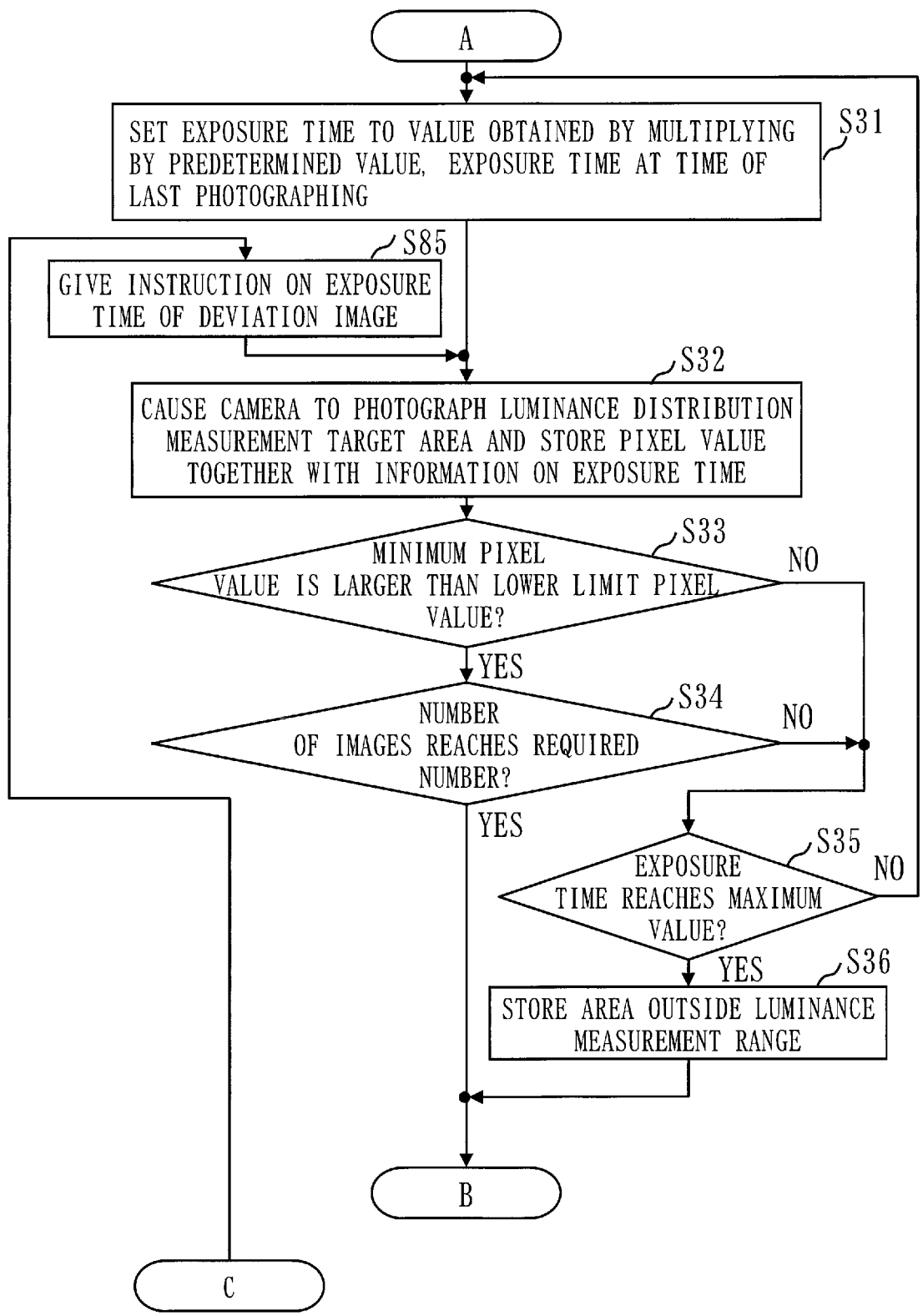
FIG. 9 is a flowchart illustrating an operation example of the luminance distribution measurement apparatus according to the second embodiment.

FIG. 9 illustrates a camera photographing process of the luminance distribution measurement apparatus 10 according to the present embodiment.

Figure 10:
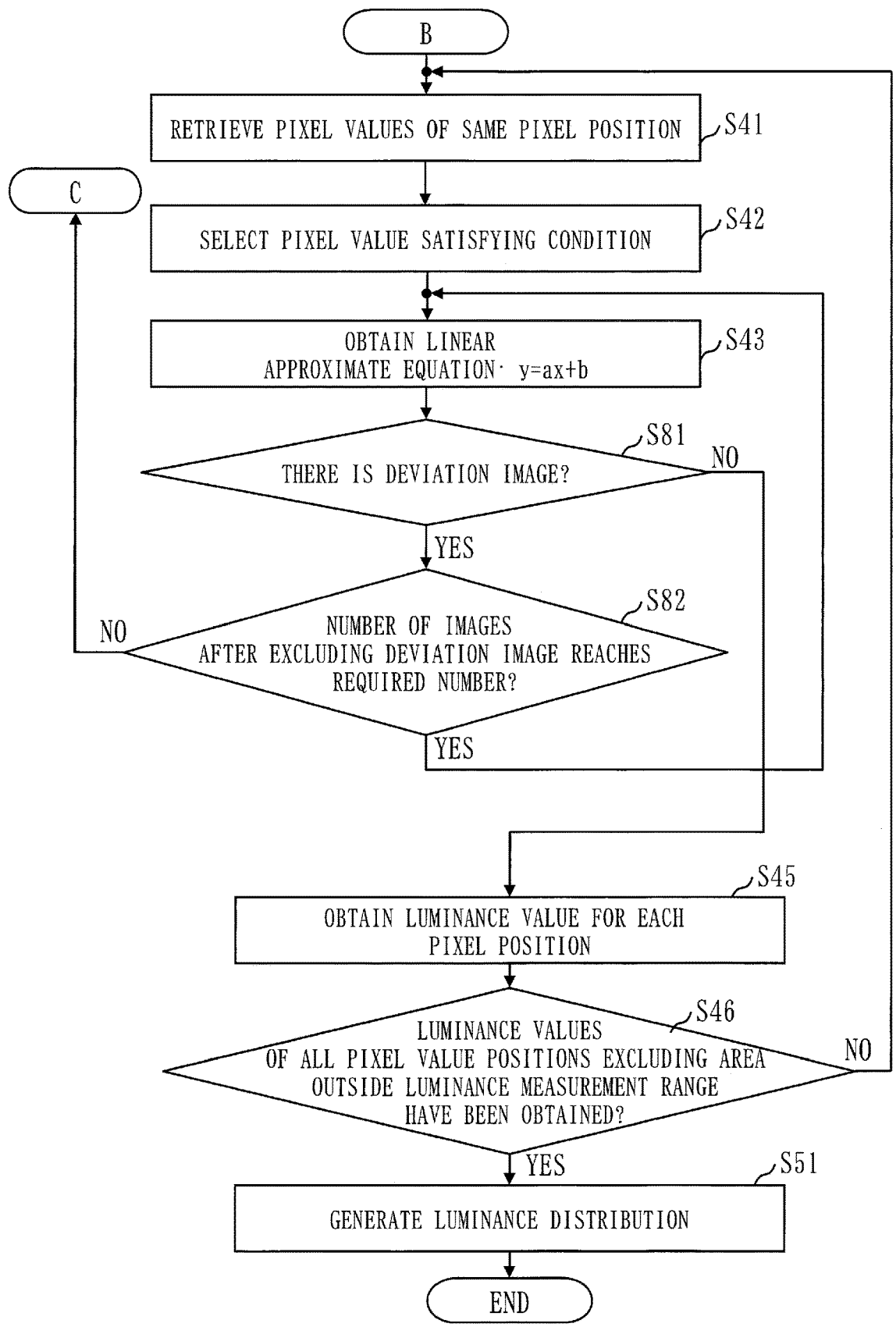
FIG. 10 is a flowchart illustrating an operation example of the luminance distribution measurement apparatus according to the second embodiment.

FIG. 10 illustrates a luminance value calculation process and a luminance distribution generation process of the luminance distribution measurement apparatus 10 according to the present embodiment.

First, with reference to FIG. 10, the luminance value calculation process and the luminance distribution generation process according to the present embodiment will be described.

Note that, also in the present embodiment, an example will be described in which the linear approximate equation is used as the model that approximates the relationship between the exposure times and the pixel values.

In FIG. 10, steps S41 to S43 are the same as those illustrated in the first embodiment, therefore, descriptions will be omitted.

The deviation image detection section 81 examines whether or not there is an image (hereinafter, referred to as a deviation image) whose points (points plotted in FIG. 6) indicating the relationship between the pixel values and the exposure times significantly largely deviate from the linear approximate equation (each line in FIG. 6) compared to those of other images (step S81).

If there is no deviation image (NO in step S81), the processes of and after step S45 are performed. Since the processes of and after step S45 are the same as those described in the first embodiment, descriptions will be omitted.

On the other hand, when there is a deviation image (YES in step S81), it is considered that intensity of natural light at a time of photographing of the deviation image is different from intensity of natural light at times of photographing the other images.

In this case, the deviation image detection section 81 determines whether or not the number of photographed images after removing the deviation image reaches the required number (step S82).

When the number of photographed images after removing the deviation image reaches the required number (YES in step S82), the exposure time-pixel value model generation section 51 newly generates the linear approximate equation (model), using remaining images other than the deviation image (step S43).

The processes of and after step S81 are performed for the new linear approximate equation generated in step S43.

On the other hand, when the number of photographed images after removing the deviation image does not reach the required number (NO in step S82), the deviation image detection section 81 instructs the camera control section 21 to photograph the luminance distribution measurement target area under the same exposure time as that of the deviation image (step S85 in FIG. 9). Based on the instruction from the deviation image detection section 81, the camera control section 21 causes the camera 1 to photograph the luminance distribution measurement target area under the same exposure time as that of the deviation image.

Since step S32 in FIG. 9 to step S42 in FIG. 10 are the same as those in the first embodiment, descriptions will be omitted.

In step S43, the exposure time-pixel value model generation section 51 newly generates the linear approximate equation (model), using the image obtained by the new photographing in step S85 and the remaining images other than the deviation image.

*Description of Effect of Embodiment*

As described above, in the present embodiment, presence or absence of the deviation image is examined, and if there is the deviation image, the deviation image is removed, and a new model is generated. Therefore, it is possible to obtain the luminance value without using the image photographed when the light amount of natural light significantly changes. Therefore, according to the present embodiment, it is possible to suppress the variation in the measurement errors in the luminance distribution.

Third Embodiment

In the present embodiment, differences from the first embodiment will be mainly described.

Note that, matters not described below are the same as those in the first embodiment.

Figure 11:
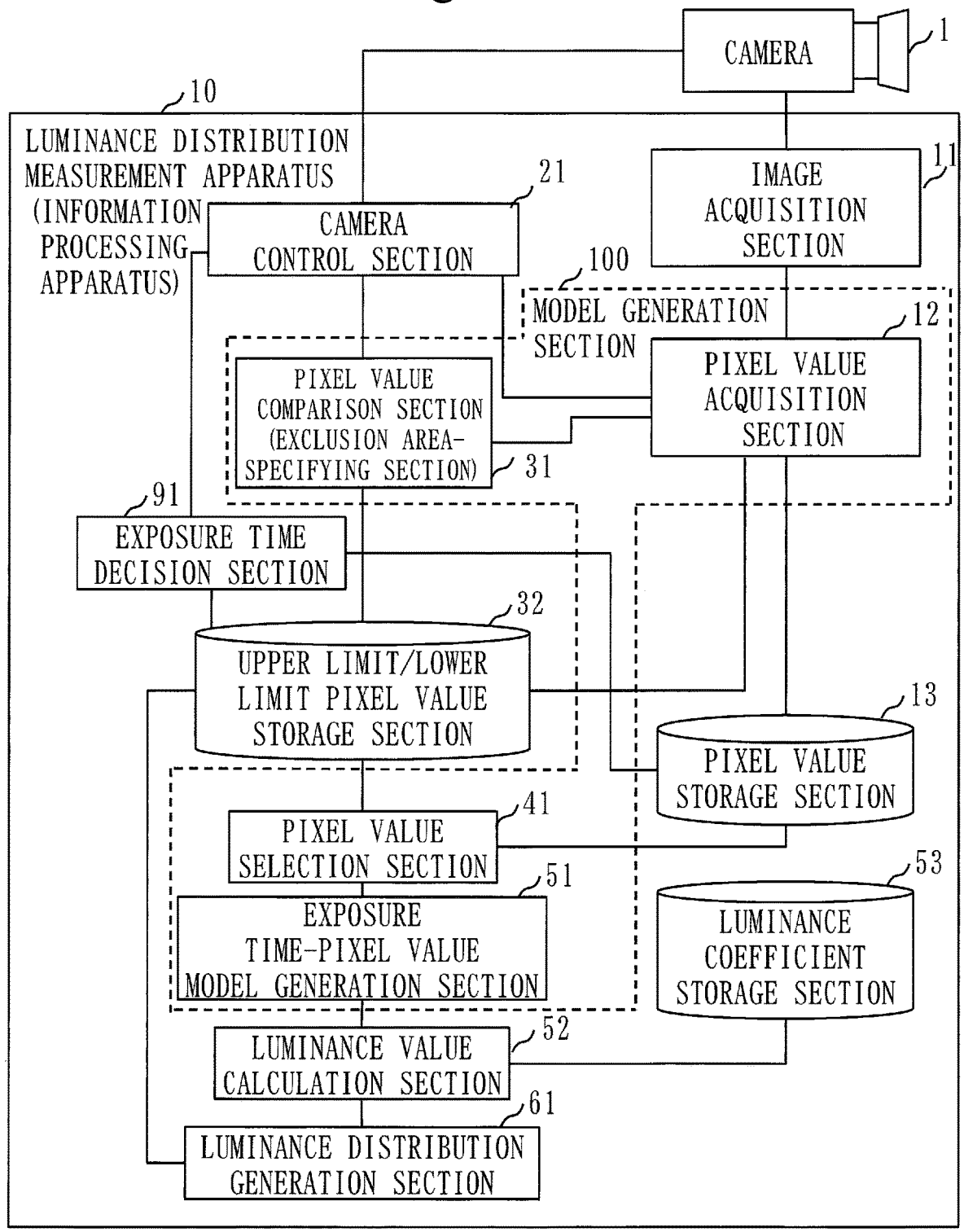
FIG. 11 is a diagram illustrating a functional configuration example of a luminance distribution measurement apparatus according to a third embodiment.

*Description of Configuration* FIG. 11 illustrates a functional configuration example of the luminance distribution measurement apparatus 10 according to a third embodiment.

In FIG. 11, elements having the same reference numerals as those in FIG. 1 indicate the same or corresponding parts. Descriptions of the elements having the same reference numerals as those in FIG. 1 will be omitted.

In FIG. 11, an exposure time decision section 91 is added to the configuration illustrated in FIG. 1.

When the required number of images is not obtained, the exposure time decision section 91 decides an exposure time to be used for next photographing based on a difference time between either a minimum exposure time or a maximum exposure time and an exposure time used for latest photographing.

The exposure time decision section 91 is also realized by a program. The program that realizes function of the exposure time decision section 91 is executed by the processor 901 illustrated in FIG. 5.

*Description of Operation*

Figure 12:
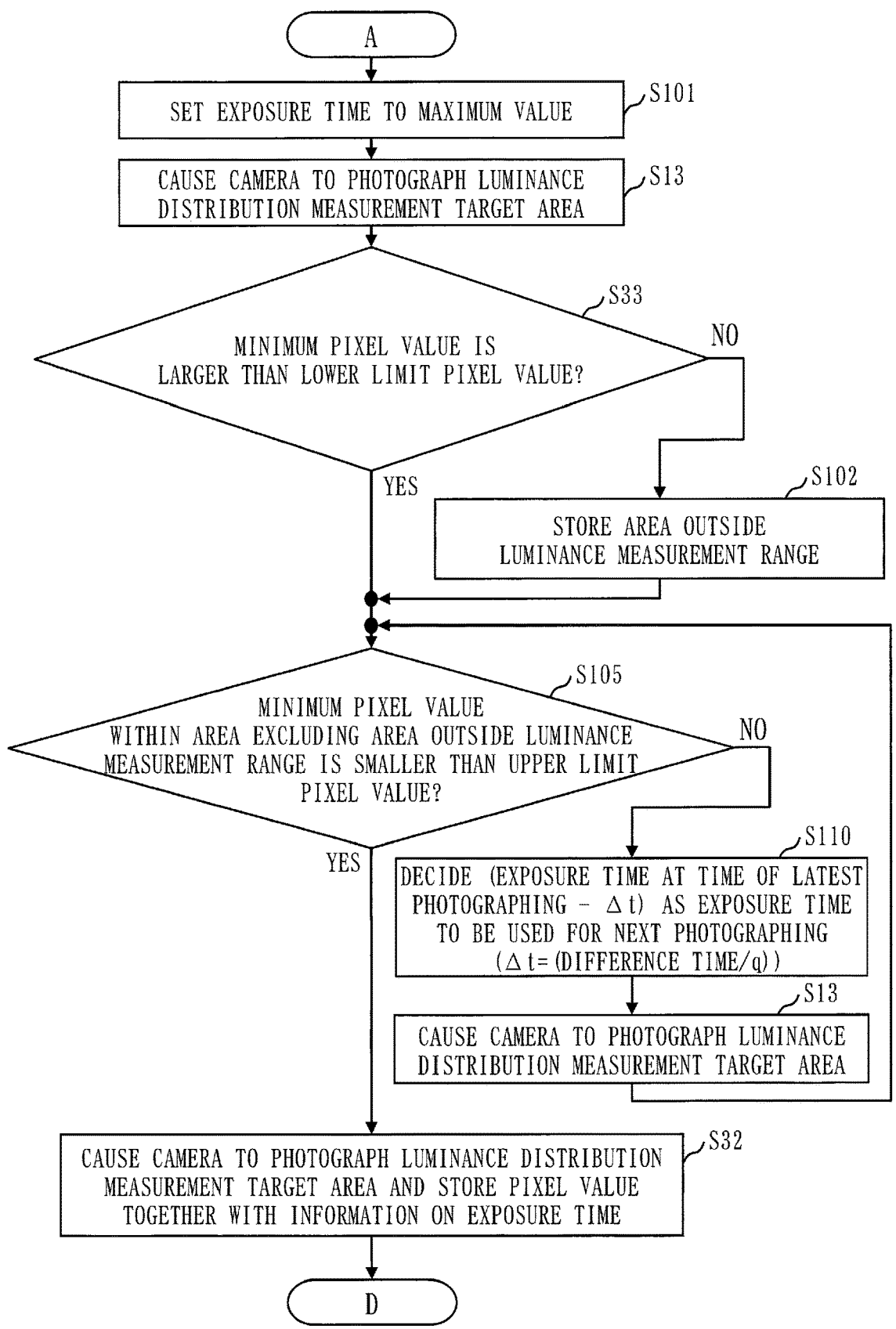
FIG. 12 is a flowchart illustrating an operation example of the luminance distribution measurement apparatus according to the third embodiment.
Figure 13:
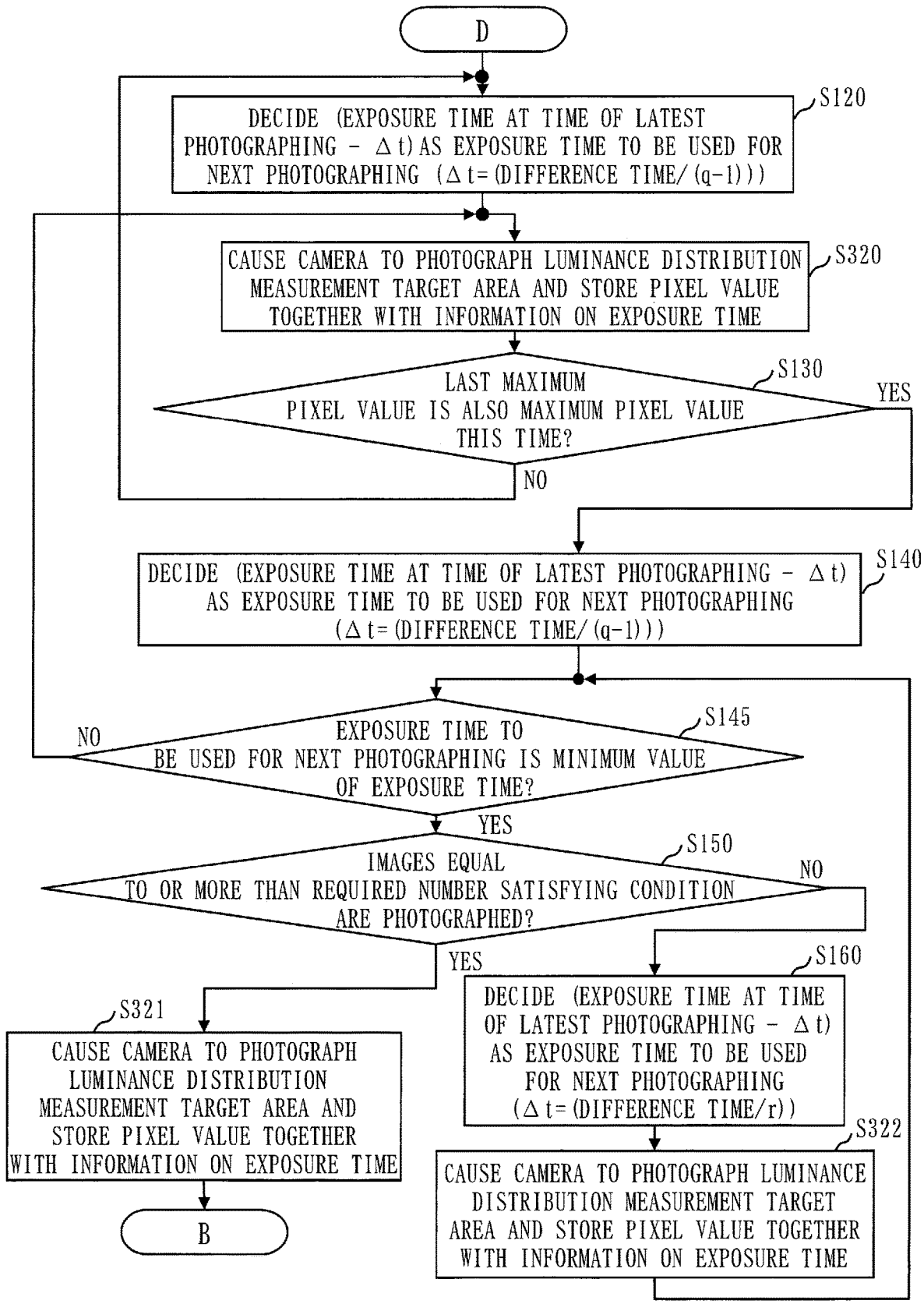
FIG. 13 is a flowchart illustrating an operation example of the luminance distribution measurement apparatus according to the third embodiment.

FIGS. 12 and 13 illustrate a camera photographing process of the luminance distribution measurement apparatus 10 according to the present embodiment.

Also in the present embodiment, the gain value adjustment process of the camera is as illustrated in FIG. 2. Further, the luminance value calculation process and the luminance distribution generation process are as illustrated in FIG. 4.

Note that, also in the present embodiment, an example will be described in which the linear approximate equation is used as the model that approximates the relationship between the exposure times and the pixel values.

The camera photographing process according to the present embodiment will be described with reference to FIGS. 12 and 13.

The exposure time decision section 91 instructs the camera control section 21 to set the exposure time of the camera 1 to the maximum value. The camera control section 21 sets the exposure time of the camera to the maximum value (step S101).

Further, the camera control section 21 causes the camera 1 to photograph the luminance distribution measurement target area (step S13).

The pixel value comparison section 31 determines whether or not the minimum pixel value in the image is larger than the lower limit pixel value (step S33).

When the minimum pixel value in the image is equal to or smaller than the lower limit pixel value (NO in step S33), the pixel value comparison section 31 specifies an area in which the minimum pixel value is equal to or smaller than the lower limit pixel value as the area outside the luminance measurement range, and stores the information indicating the area outside the luminance measurement range in the upper limit/lower limit pixel value storage section 32 (step S102).

When step S33 is YES or after the process of step S102 is performed when step S33 is NO, the pixel value comparison section 31 determines whether or not the minimum pixel value within an area excluding the area outside the luminance measurement range in the photographed image is smaller than the upper limit pixel value (step S105).

When the minimum pixel value in the area excluding the area outside the luminance measurement range in the photographed image is equal to or larger than the upper limit pixel value (NO in step S105), the exposure time decision section 91 decides the exposure time to be used for the next photographing. Here, the required number is assumed to be q, the required number being the number of photographed images required for generating the linear approximate equation. A time is assumed to be Δt, which is obtained by dividing by q, a difference time between the minimum value of the exposure time and the exposure time at the time of the latest photographing. The exposure time decision section 91 decides (the exposure time at the time of the latest photographing—Δt) as the exposure time to be used for the next photographing (step S110).

Next, the camera control section 21 causes the camera 1 to photograph the luminance distribution measurement target area under the exposure time decided in step S110 (step S13). Subsequently, the process returns to step S105.

On the other hand, when in the determination in step S105, the minimum pixel value in the area excluding the area outside the luminance measurement range in the photographed image is smaller than the upper limit pixel value (YES in step S105), the camera control section 21 causes the camera 1 to photograph the luminance distribution measurement target area, and the pixel value acquisition section 12 stores in the pixel value storage section 13, the pixel value of each pixel position in the image together with the information on the exposure time at the time of photographing (step S32).

Next, the exposure time decision section 91 decides the exposure time to be used for the next photographing. Here, the required number is also assumed to be q, the required number being the number of photographed images required for generating the linear approximate equation. Further, a time is assumed to be Δt, which is obtained by dividing by (q−1), the difference time between the minimum value of the exposure time and the exposure time at the time of the latest photographing. The exposure time decision section 91 decides (the exposure time at the time of the latest photographing—Δt) as the exposure time to be used for the next photographing (step S120).

Next, the camera control section 21 causes the camera 1 to photograph the luminance distribution measurement target area under the exposure time decided in step S120, and the pixel value acquisition section 12 stores in the pixel value storage section 13, the pixel value of each pixel position in the image together with the information on the exposure time at the time of photographing (step S320).

Next, the pixel value comparison section 31 determines whether or not the area which has the maximum pixel value at the time of the last photographing (at the time of the photographing immediately before the photographing in step S320) is also the area which has the maximum pixel value in present photographing (photographing in step S320) (step S130).

When the area which has the maximum pixel value at the time of the last photographing is no longer the area which has the maximum pixel value in the present photographing (NO in step S130), the processes of and after step S120 are repeated.

When the area which has the maximum pixel value at the time of the last photographing is also the area which has the maximum pixel value in the present photographing (YES in step S130), the exposure time decision section 91 decides the exposure time to be used for the next photographing. Specifically, the exposure time decision section 91 decides (the exposure time at the time of the latest photographing—Δt) as the exposure time to be used for the next photographing (step S140). Note that, as with the case of step S120, Δt is the time obtained by dividing by (q−1), the difference time between the minimum value of the exposure time and the exposure time at the time of the latest photographing. Further, the latest photographing is the present photographing, that is, the photographing in step S320.

Next, the exposure time decision section 91 determines whether or not the exposure time to be used for the next photographing is the minimum value of the exposure time (step S145).

When the exposure time to be used for the next photographing is not the minimum value of the exposure time (NO in step S145), the camera control section 21 causes the camera 1 to photograph the luminance distribution measurement target area under this exposure time (the exposure time decided in step S140), and the pixel value acquisition section 12 stores in the pixel value storage section 13, the pixel value of each pixel position in the image together with the information on the exposure time at the time of photographing (step S320).

When the exposure time to be used for the next photographing is the minimum value of the exposure time (YES in step S145), the pixel value comparison section 31 examines whether or not images equal to or more than the required number for calculating the linear approximate equation are photographed, the images having the pixel values which exceed the lower limit pixel value and are smaller than the upper limit pixel value in all the pixel positions other than the area outside the luminance measurement range (step S150).

When the images equal to or more than the required number for calculating the linear approximate equation are photographed, the images having the pixel values which exceed the lower limit pixel value and are smaller than the upper limit pixel value in all the pixel positions other than the area outside the luminance measurement range (YES in step S150), the camera control section 21 causes the camera 1 to photograph the luminance distribution measurement target area under this exposure time (the exposure time decided in step S140), and the pixel value acquisition section 12 stores in the pixel value storage section 13, the pixel value of each pixel position in the image together with the information on the exposure time at the time of photographing (step S321).

On the other hand, when the images equal to or more than the required number for calculating the linear approximate equation are not photographed, the images having the pixel values which exceed the lower limit pixel value and are smaller than the upper limit pixel value in all the pixel positions other than the area outside the luminance measurement range (YES in step S150), the exposure time decision section 91 decides the exposure time to be used for the next photographing. Here, the number of images (the difference number between the number of images obtained so far and the required number) is assumed to be r, the number of images being insufficient for calculating the linear approximate equation. Further, a time is assumed to be Δt, which is obtained by dividing by (r−1), the difference time between the minimum value of the exposure time and the exposure time at the time of the latest photographing. The exposure time decision section 91 decides (the exposure time at the time of the latest photographing—Δt) as the exposure time to be used for the next photographing (step S160).

Next, the camera control section 21 causes the camera 1 to photograph the luminance distribution measurement target area under this exposure time (the exposure time decided in step S160), and the pixel value acquisition section 12 stores in the pixel value storage section 13, the pixel value of each pixel position in the image together with the information on the exposure time at the time of photographing (step S322).

After that, the processes of and after step S145 are repeated.

*Description of Effect of Embodiment*

As described above, in the present embodiment, the exposure time at the time of photographing is set in such a manner that the number of images satisfies the required number, the number of images having the pixel values which exceed the lower limit pixel value and are smaller than the upper limit pixel value in all the pixel values in the area outside the luminance measurement range. Therefore, according to the present embodiment, it is possible to obtain the luminance distribution measurement result after photographing the minimum required number of times.

Besides, in the present embodiment, an example has been described in which the exposure time is set to the maximum value in step S101 in FIG. 12. Instead of this, the exposure time may be set to the minimum value in step S101. In this case, in step S110, step S120, and step S160, the "the maximum value of the exposure time" is used instead of the "the minimum value of the exposure time".

Although the embodiments of the present invention have been described above, two or more of these embodiments may be combined and implemented.

Alternatively, one of these embodiments may be partially implemented.

Alternatively, two or more of these embodiments may be partially combined and implemented.

Note that, the present invention is not limited to these embodiments, and various modifications can be made as necessary.

\*\*\*Description of Hardware Configuration\*\*\*

Finally, supplementary descriptions of the hardware configuration of the luminance distribution measurement apparatus 10 will be given.

The processor 901 illustrated in FIG. 5 is an IC (Integrated Circuit) that performs processing.

The processor 901 is a CPU (Central Processing Unit), a DSP (Digital Signal Processor), or the like.

The memory 902 illustrated in FIG. 5 is a RAM (Random Access Memory).

The storage device 913 illustrated in FIG. 5 is a ROM (Read Only Memory), a flash memory, an HDD (Hard Disk Drive), or the like.

Further, an OS (Operating System) is also stored in the storage device 913.

Then, at least a part of the OS is executed by the processor 901.

While executing at least the part of the OS, the processor 901 executes programs that realize functions of the image acquisition section 11, the camera control section 21, the model generation section 100, the luminance value calculation section 52, the luminance distribution generation section 61, the deviation image detection section 81, and the exposure time decision section 91.

By the processor 901 executing the OS, task management, memory management, file management, communication control, and the like are performed.

Further, at least one of information, data, a signal value, and a variable value indicating a processing result of the image acquisition section 11, the camera control section 21, the model generation section 100, the luminance value calculation section 52, the luminance distribution generation section 61, the deviation image detection section 81, and the exposure time decision section 91, is stored in at least one of the memory 902, the storage device 913, and a register and a cache memory in the processor 901.

Further, the programs that realize the functions of the image acquisition section 11, the camera control section 21, the model generation section 100, the luminance value calculation section 52, the luminance distribution generation section 61, the deviation detection section 81, and the exposure time decision section 91 is stored in a portable recording medium such as a magnetic disk, a flexible disk, an optical disk, a compact disk, a Blu-ray (registered trademark) disk, a DVD, or the like. Then, the portable recording medium storing the programs that realize the functions of the image acquisition section 11, the camera control section 21, the model generation section 100, the luminance value calculation section 52, the luminance distribution generation section 61, the deviation image detection section 81, and the exposure time decision section 91 may be distributed commercially.

Further, "section" of the image acquisition section 11, the camera control section 21, the model generation section 100, the luminance value calculation section 52, the luminance distribution generation section 61, the deviation image detection section 81, and the exposure time decision section 91 may be read as "circuit" or "step" or "procedure" or "process".

Further, the luminance distribution measurement apparatus 10 may be realized by a processing circuit. The processing circuit is, for example, a logic IC (Integrated Circuit), a GA (Gate Array), an ASIC (Application Specific Integrated Circuit), or an FPGA (Field-Programmable Gate Array).

Besides, in the present specification, a superordinate concept of the processor and the processing circuit is referred to as "processing circuitry".

That is, each of the processor and the processing circuit is a specific example of the "processing circuitry".

REFERENCE SIGNS LIST

1: camera, 10: luminance distribution measurement apparatus, 11: image acquisition section, 12: pixel value acquisition section, 13: pixel value storage section, 21: camera control section, 31: pixel value comparison section, 32: upper limit/lower limit pixel value storage section, 41: pixel value selection section, 51: exposure time-pixel value model generation section, 52: luminance value calculation section, 53: luminance coefficient storage section, 61: luminance distribution generation section, 81: deviation image detection section, 91: exposure time decision section, 100: model generation section, 901: processor, 902: memory, 911: image interface, 912: camera control interface, 913: storage device.

The invention claimed is:
1. An information processing apparatus comprising:
processing circuitry
to fix among parameters for photographing which are set in a camera, another parameter than exposure time, and cause the camera to photograph a photographing target area while changing the exposure time;
to acquire N (N≥3) images of the photographing target area acquired by photographing by the camera;
to extract for each pixel position, pixel values of a same pixel position from the N images, and generate a model indicating for each pixel position, a relationship between exposure times and pixel values, based on the extracted pixel values of the same pixel position and an exposure time at a time of photographing of each of the N images;
to calculate a luminance value for each pixel position, using the generated model and a luminance coefficient; and
to generate a luminance distribution of the photographing target area, using the luminance value of each pixel position.
2. The information processing apparatus according to claim 1,
wherein the processing circuitry causes the camera to photograph the photographing target area while changing the exposure time by multiplying the exposure time by a predetermined value.

3. The information processing apparatus according to claim 1,
wherein the processing circuitry generates as the model, a linear approximate equation indicating for each pixel position, the relationship between the exposure times and the pixel values.

4. The information processing apparatus according to claim 1,
wherein the processing circuitry selects a pixel value satisfying a predetermined condition from the pixel values of the same pixel position extracted from the N images, and generates the model based on the selected pixel value and the exposure time of each of the N images.

5. The information processing apparatus according to claim 1,
wherein the processing circuitry
specifies as an exclusion area, a pixel area for which the number of images in which a pixel value has been obtained satisfying a predetermined condition does not reach a required number being the number of images required for generating the model when a maximum exposure time is reached as a result of increasing the exposure time and photographing the photographing target area a plurality of times by the camera, and
extracts for each pixel position, the pixel values of the same pixel position in another area than the exclusion area from the N images.

6. The information processing apparatus according to claim 1,
wherein the processing circuitry
detects after the model is generated, an image in which the relationship between the exposure times and the pixel values of each pixel position deviates from the model, and
newly generates the model, using images among the N images other than the image detected.

7. The information processing apparatus according to claim 1,
wherein the processing circuitry
detects after the model is generated, an image in which the relationship between the exposure times and the pixel values of each pixel position deviates from the model, and
causes the camera to newly photograph the photographing target area under a same exposure time as that of the image detected, and
newly generates the model, using images among the N images other than the image detected and an image obtained by newly photographing by the camera.

8. The information processing apparatus according to claim 1,
wherein the processing circuitry
decides, when a required number of images being the number of images required for generating the model has not been obtained, an exposure time to be used for next photographing, based on a difference time between one of a minimum exposure time and a maximum exposure time and an exposure time used for latest photographing, and
causes the camera to photograph the photographing target area under the exposure time decided.

9. The information processing apparatus according to claim 8,
wherein the processing circuitry decides as the exposure time to be used for the next photographing, a time obtained by subtracting from the exposure time used for the latest photographing, a time obtained by dividing the difference time by one of the required number and (the required number −1).

10. The information processing apparatus according to claim 8,
wherein the processing circuitry
calculates a difference number between the number of images obtained so far and the required number, and
decides as the exposure time to be used for the next photographing, a time obtained by subtracting from the exposure time used for the latest photographing, a time obtained by dividing the difference time by (the difference number −1).

11. An information processing method comprising:
fixing among parameters for photographing which are set in a camera, another parameter than exposure time, and causing the camera to photograph a photographing target area while changing the exposure time;
acquiring N (N≥3) images of the photographing target area acquired by photographing by the camera;
extracting for each pixel position, pixel values of a same pixel position from the N images, and generating a model indicating for each pixel position, a relationship between exposure times and pixel values, based on the extracted pixel values of the same pixel position and an exposure time at a time of photographing of each of the N images;
calculating a luminance value for each pixel position, using the generated model and a luminance coefficient; and
generating a luminance distribution of the photographing target area, using the luminance value of each pixel position.

12. A non-transitory computer readable medium storing an information processing program which causes a computer to execute:
a camera control process of fixing among parameters for photographing which are set in a camera, another parameter than exposure time, and causing the camera to photograph a photographing target area while changing the exposure time;
an image acquisition process of acquiring N (N≥3) images of the photographing target area acquired by photographing by the camera;
a model generation process of extracting for each pixel position, pixel values of a same pixel position from the N images, and generating a model indicating for each pixel position, a relationship between exposure times and pixel values, based on the extracted pixel values of the same pixel position and an exposure time at a time of photographing of each of the N images;
a luminance value calculation process of calculating a luminance value for each pixel position, using the generated model and a luminance coefficient; and
a luminance distribution generation process of generating a luminance distribution of the photographing target area, using the luminance value of each pixel position.

* * * * *